May 23, 1933.  C. G. MUNTERS  1,910,853
ABSORPTION REFRIGERATING APPARATUS
Filed Feb. 27, 1929  2 Sheets-Sheet 1

INVENTOR
Carl Georg Munters
BY
HIS ATTORNEY

May 23, 1933.     C. G. MUNTERS     1,910,853
ABSORPTION REFRIGERATING APPARATUS
Filed Feb. 27, 1929     2 Sheets-Sheet 2
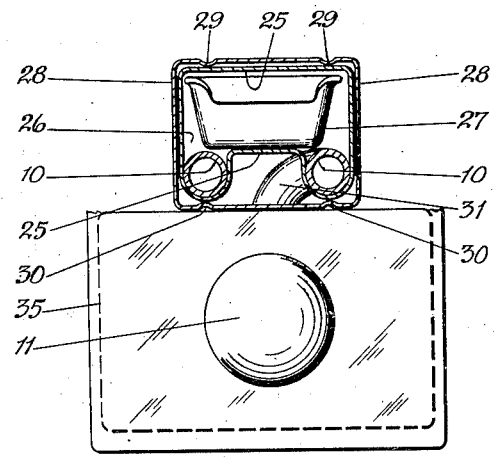
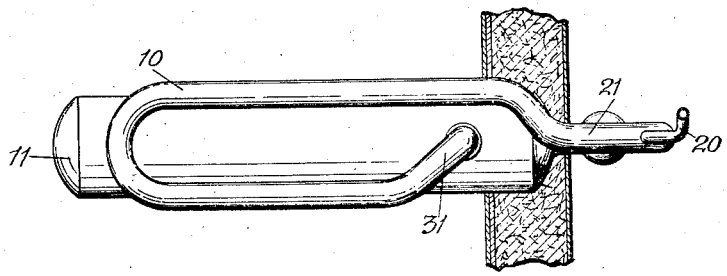
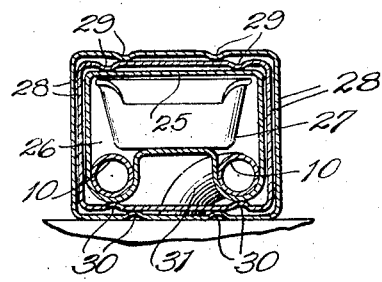

Patented May 23, 1933

1,910,853

UNITED STATES PATENT OFFICE

CARL GEORG MUNTERS, OF STOCKHOLM, SWEDEN, ASSIGNOR TO ELECTROLUX SERVEL CORPORATION, OF NEW YORK, N. Y., A CORPORATION OF DELAWARE

ABSORPTION REFRIGERATING APPARATUS

Application filed February 27, 1929, Serial No. 343,017, and in Sweden April 4, 1928.

My invention relates to absorption refrigerating apparatus and particularly to such apparatus mounted in refrigerator cabinets. Still more particularly it relates to such refrigerating apparatus containing a pressure equalizing gas circulating through the evaporator and absorber of the apparatus.

It has previously been suggested in absorption refrigerating apparatus of the kind above set forth to evaporate the refrigerant in a plurality of evaporators at different temperatures and containing a pressure equalizing gas, one of said evaporators being adapted for production of ice. My invention has for its purpose to improve the insulation of said evaporators from each other in order to maintain the different temperatures desired. For this purpose an evaporator adapted for producing ice is provided with a jacket surrounding the same and forming an insulation from a second evaporator arranged in the same part of the cabinet and adapted for cooling of the air in said cabinet. In a preferred embodiment of my invention said jacket is constructed in such a manner that the insulation is formed by an air layer.

My invention will in the following be more clearly described with reference to the accompanying drawings, wherein:—

Fig. 2 and Fig. 3 show in detail the evaporators above referred to.

Fig. 4 shows a modification.

Figure 1:
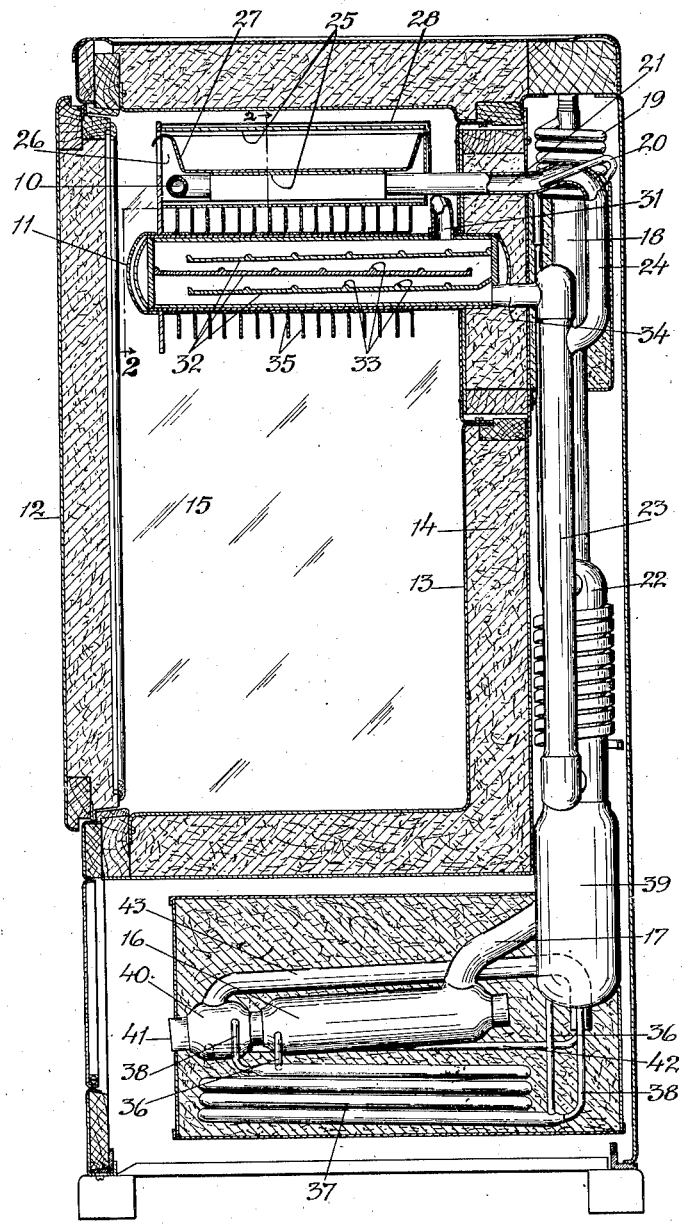
Fig. 1 is a cross sectional view of a refrigerator cabinet containing an absorption refrigerating apparatus mounted therein and containing a pressure equalizing auxiliary medium, in accordance with my present invention.

Referring more particularly to Fig. 1, reference characters 10 and 11 designate two evaporators situated inside a refrigerator cabinet 12 comprising a food storage compartment 15 provided with a liner 13. A cork insulation 14 surrounds compartment 15 of the refrigerator cabinet in which the evaporators 10 and 11 are situated, said evaporators being in the following referred to as the ice freezing evaporator and the air cooling evaporator respectively. The type of the refrigerator cabinet is not important as respects the present invention. The evaporators are preferably placed in the upper part of the compartment 15.

Reference character 16 designates the generator which contains a cooling agent or refrigerant, for instance ammonia, dissolved in a suitable absorption liquid, such as water. Although it is obvious that various substances may be used as cooling agent, ammonia is preferred but, in describing the apparatus as using ammonia and specific related substances, it is to be understood that this is by way of example only and imposes no limitation. The application of heat to generator 16 expels ammonia vapor from the solution therein and the vapor passes through conduit 17, the upper part of which forms a rectifier 18, and into condenser 19 which consists of a water cooled coiled pipe, the end 20 of which enters ice freezing evaporator 10. The ammonia is condensed in condenser 19 to liquid form and flows through conduit 20 into conduit 21 forming part of the ice freezing evaporator 10. From absorber 22 an auxiliary medium, as for example hydrogen, is introduced in a substantially pure state into conduit 21 after having passed through gas heat exchanger 23 and conduit 24. The liquid ammonia evaporates rapidly in said pure hydrogen whereby a low temperature is obtained in ice freezing evaporator 10. In order to facilitate the ice production, evaporator 10 is surrounded by a box-shaped metal cover 25 arranged in heat conducting relation therewith and consisting, for example of iron, copper or aluminum. In a preferred form, said cover surrounds ice evaporator 10 on four sides forming a special compartment 26 for containing objects to be quickly cooled as, for instance, ice trays or containers 27. The box-shaped cover 25 is surrounded by a jacket 28 so arranged that between the cover and jacket a heat insulating air layer is formed. Though in the drawings only one jacket 28 is shown, a plurality of jackets can be arranged in order to form a plurality of air layers as shown in Fig. 4, thus improving the insulation. Preferably the jacket or jackets 28 is made of aluminum or aluminum alloy. The walls of said jacket may be enamelled in order to give a surface readily adapted to be cleaned. Cover 25 and jacket 28 are separated from each other in some way or other, as, in a preferred manner, by means of inward bends 29 and 30 of cover 25, as shown in Fig. 2, or by separating elements. The necessary distance between the two members 25 and 28 is thereby maintained without impairing the insulating properties of the air layer by a too large contact surface.

When the hydrogen has been saturated with ammonia vapor to a certain extent, the gas mixture and the remaining part of liquid ammonia pass through conduit 31 into the air cooling evaporator 11. The evaporator 11, which preferably is arranged beneath ice evaporator 10 in order that the liquid ammonia may flow thereinto by gravity, is provided with inner plates 32 of known type made of, for instance, cast-iron and provided with ribs 33 or the like for the forming of liquid pools thereon. The hydrogen is here further saturated by the evaporation of ammonia at a higher temperature than in ice freezing evaporator 10, whereafter the gas mixture obtained is led by gravity into heat exchanger 23 through conduit 34 and thence to absorber 22.

The air cooling evaporator 11 is preferably mounted in a horizontal position and is provided with fins or flanges 35 arranged in a vertical or substantially vertical position, thus permitting the air in the cabinet to circulate through the spaces formed between the flanges. The ice freezing evaporator 10, which is arranged above the air cooling evaporator 11, is so located and disposed that it permits such circulation of the air, the flanges or fins 35 extending laterally beyond evaporator 11.

In the upper part of absorber 22, weak ammonia solution is introduced through conduit 36, part of which forms the outer conduit of a heat exchanger 37, the inner conduit 38 of which conducts rich solution from the lower part 39 of absorber 22 to chamber 40 forming an auxiliary generator. A flue 41 passes centrally through chamber 40 and generator 16. A suitable source of heat, not shown in the drawings, as, for instance, an electric heating unit for resistance or a gas burner, is placed in the lower end of flue 41, which latter is arranged in a somewhat inclined position, and heat is transferred from said source of heat through the wall of flue 41 to chamber 40 and generator 16. Chamber 40 communicates with the upper part of generator 16 by means of conduit 42, the upper portion of which is made and arranged so as to form the upwardly extending vapor and liquid pipe of a thermosyphon through which ammonia solution is forced into generator 16 by means of ammonia gas expelled in chamber 40 and introduced into conduit 42 through gas conduit 43.

While I have shown a more or less specific embodiment of my invention, it is to be understood that modifications thereof fall within its scope, which is to be limited only by the appended claims viewed in the light of the prior art.

Having thus described my invention, what I claim is:—

1. A refrigerator comprising, in combination, a cabinet having a food storage compartment, an absorption refrigerating apparatus mounted in said cabinet, said apparatus comprising a first evaporator in said food storage compartment, said first evaporator comprising an extended conduit placed in a substantially horizontal position, a housing around said conduit adapted to receive an ice tray, an insulating jacket around said housing, a second evaporator in said food storage compartment below and in communication with said first evaporator comprising a cylindrical shell and substantially horizontally disposed trays in said shell, heat transfer fins on said second evaporator extending laterally beyond said first evaporator, and means to withdraw gas from said second evaporator.

2. A refrigerator comprising, in combination, a cabinet having a food storage compartment, an absorption refrigerating apparatus mounted in said cabinet, said apparatus comprising a first evaporator in said food storage compartment, said first evaporator comprising an extended conduit placed in a substantially horizontal position, a housing around said conduit adapted to receive an ice tray, a second evaporator connected to said first evaporator and comprising a cylindrical shell placed in a substantially horizontal position in said food storage compartment below said first evaporator, a series of substantially horizontal trays in said second evaporator, heat transfer fins on said second evaporator extending laterally beyond said first evaporator, means to introduce refrigerant into said first evaporator and means for withdrawing gas from said second evaporator.

3. A refrigerator comprising, in combination, a cabinet having a food storage compartment, an absorption refrigerating apparatus mounted in said cabinet, said apparatus comprising a first evaporator in said food storage compartment, said first evaporator comprising an extended conduit placed in a substantially horizontal position, a housing around said conduit adapted to receive an ice tray, a jacket around said housing spaced therefrom to form an insulating air space therebetween, a second evaporator in said food storage compartment below said first evaporator and connected to said first evaporator, heat transfer fins on said second evaporator extending laterally beyond said first evaporator, means to introduce refrigerant into said first evaporator and means for withdrawing gas from said second evaporator.

4. A refrigerator comprising, in combination, a cabinet having a food storage compartment, an absorption refrigerating apparatus mounted in said cabinet, said apparatus comprising an absorber, a conduit for conducting an inert gas from said absorber, the portion of said conduit remote from said absorber constituting a first evaporator, a second evaporator, said evaporators being connected and located in said food storage compartment, means to introduce a refrigerant into said first evaporator, means to conduct a gaseous mixture of refrigerant and inert gas from said second evaporator to said absorber and a jacket around said first evaporator for insulating it from said second evaporator and from said food storage compartment.

5. A refrigerator comprising, in combination, a cabinet having a food storage compartment, an absorption refrigerating apparatus mounted in said cabinet, said apparatus comprising an absorber, a conduit for conducting an inert gas from said absorber, the portion of said conduit remote from said absorber being in a substantially horizontal position and constituting a first evaporator, a housing around said first evaporator adapted to receive an ice tray, an insulating jacket around said housing, a second evaporator in said food storage compartment below said first evaporator and connected therewith, heat transfer fins on said second evaporator extending laterally beyond said first evaporator, means to introduce refrigerant into said first evaporator, and means to conduct a mixture of refrigerant and inert gas from said second evaporator to said absorber.

6. A refrigerator comprising, in combination, a cabinet having a food storage compartment, an absorption refrigerating apparatus mounted in said cabinet, said apparatus comprising an absorber, a conduit for conducting an inert gas from said absorber, the portion of said conduit remote from said absorber being in a substantially horizontal position and constituting a first evaporator, a housing around said first evaporator adapted to receive an ice tray, an insulating jacket around said housing, a second evaporator placed in a substantially horizontal position in said food storage compartment below said first evaporator and connected therewith, a series of substantially horizontal trays in said second evaporator, heat transfer fins on said second evaporator extending laterally beyond said first evaporator, means to introduce refrigerant into said first evaporator, and means to conduct a mixture of refrigerant and inert gas from said second evaporator to said absorber.

7. A refrigerator comprising, in combination, a cabinet having a food storage compartment, an absorption refrigerating apparatus mounted in said cabinet, said apparatus comprising an absorber, a conduit for conducting an inert gas from said absorber, the portion of said conduit remote from said absorber being in a substantially horizontal position and constituting a first evaporator, a housing around said first evaporator adapted to receive an ice tray, a jacket around said housing spaced therefrom to form an insulating air space therebetween, a second evaporator in said food storage compartment below said first evaporator and connected therewith, heat transfer fins on said second evaporator extending laterally beyond said first evaporator, means to introduce refrigerant into said first evaporator and means to conduct a mixture of refrigerant and inert gas from said second evaporator to said absorber.

8. In a refrigerating apparatus, in combination, a first evaporator comprising a looped tubular conduit having horizontally disposed branches, a second evaporator comprising a horizontally disposed hollow drum situated below said first evaporator, said evaporators being connected for flow of fluid from the first evaporator to the second evaporator, means for introducing inert gas and a refrigerant into one end of said tubular conduit and means for withdrawing a mixture of inert gas and refrigerant from said hollow drum.

9. In a refrigerating apparatus, in combination, a first evaporator comprising a looped tubular conduit having horizontally disposed branches, spaced plate members forming an air insulation space surrounding said conduit and adapted to enclose an ice tray, a second evaporator comprising a horizontally disposed hollow drum situated below said first evaporator, a series of liquid retaining plates in said drum, said evaporators being connected for flow of fluid from the first evaporator to the second evaporator, means for introducing an inert gas and a refrigerant into one end of said tubular conduit and means for withdrawing a mixture of inert gas and refrigerant from said hollow drum.

10. In a refrigerating apparatus, in combination, a first evaporator comprising a looped tubular conduit having horizontally disposed branches, spaced plate members forming an air insulation space surrounding said conduit and adapted to enclose an ice tray, a second evaporator comprising a horizontally disposed hollow drum situated below said first evaporator, said evaporators being connected for flow of fluid from the first evaporator to the second evaporator, means for insulating one evaporator from the other, means for introducing an inert gas and a refrigerant into one end of said tubular conduit and means for withdrawing a mixture of inert gas and refrigerant from said hollow drum.

11. In a refrigerating apparatus, in combination, a first evaporator comprising a looped tubular conduit having horizontally disposed branches, spaced plate members forming an air insulation space surrounding said conduit and adapted to enclose an ice tray, a second evaporator comprising a horizontally disposed hollow drum situated below said first evaporator, said evaporators being connected for flow of fluid from the first evaporator to the second evaporator, a series of heat transfer fins on said hollow drum, means for introducing an inert gas and a refrigerant into one end of said tubular conduit and means for withdrawing a mixture of inert gas and refrigerant from said hollow drum.

12. A refrigerator comprising, in combination, a cabinet having a food storage compartment, and absorption refrigerating apparatus mounted in said cabinet, said apparatus comprising a first evaporator in said food storage compartment, a second evaporator in said food storage compartment immediately below said first evaporator, means to introduce liquid refrigerant and inert gas into said first evaporator, means to conduct fluid from said first evaporator to said second evaporator, means to conduct fluid from said second evaporator, spaced plate members forming an air insulation space surrounding said first evaporator and adapted to enclose an ice tray and means providing extended surface on said second evaporator for cooling air.

13. A two-temperature evaporator structure adapted for flow of refrigerant and inert gas therethrough comprising a first section for producing ice and a second section for cooling air, said sections being connected in series and one of said sections being situated higher than the other to permit downward flow of liquid from one to the other, said first section including substantially horizontally disposed tubing, a plate member in heat exchange relation with said tubing and formed to support an ice tray and to extend around the ice tray, a second plate member extending around said ice tray and spaced from the first-mentioned plate member, and end members cooperating with said plate members to complete an ice tray enclosure, said plate members and said end members forming a dead gas space around said ice tray to insulate the ice tray from surrounding air.

14. A two-temperature evaporator structure adapted for flow of refrigerant and inert gas therethrough comprising a first section for producing ice and a second section for cooling air, said sections being connected in series and one of said sections being situated higher than the other to permit downward flow of liquid from one to the other, said first section including substantially horizontally disposed tubing, a plate member in heat exchange relation with said tubing and formed to support an ice tray and to extend around the ice tray, a plurality of other plate members extending around said ice tray and spaced from the first-mentioned plate member and from each other, and end members cooperating with said plate members to complete an ice tray enclosure, said plate members and said end members forming a plurality of dead gas spaces around said ice tray to insulate the ice tray from surrounding air.

15. A two-temperature evaporator structure adapted for flow of refrigerant and inert gas therethrough comprising a first section for producing ice and a second section for cooling air, said sections being connected in series and one of said sections being situated higher than the other to permit downward flow of liquid from one to the other, said first section including substantially horizontally disposed tubing, a plate member in heat exchange relation with said tubing and formed to support an ice tray and to extend around the ice tray, a second plate member extending around said ice tray and spaced from the first-mentioned plate member, end members cooperating with said plate members to complete an ice tray enclosure, said plate members and said end members forming a dead gas space around said ice tray to insulate the ice tray from surrounding air, and heat transfer fins on said second section.

In testimony whereof I hereunto affix my signature.

CARL GEORG MUNTERS.